United States Patent [19]

Shanahan et al.

[11] 4,015,176
[45] Mar. 29, 1977

[54] APPARATUS FOR REMOVING BIRDS AND OTHER PESTS

[75] Inventors: Francis V. Shanahan, Valley Stream; Herman H. Feller, Brooklyn, both of N.Y.

[73] Assignee: Shock-M-All, Inc., Valley Stream, N.Y.

[22] Filed: Sept. 25, 1975

[21] Appl. No.: 616,802

[52] U.S. Cl. .................................. 361/232; 43/99
[51] Int. Cl.² ............................................ H05C 1/00
[58] Field of Search ............ 317/262 S; 43/66, 98, 43/99, 107, 58, 60, 62; 119/25, 26, 29, 97 AR

[56] References Cited
UNITED STATES PATENTS

| | | | |
|---|---|---|---|
| 2,400,829 | 5/1946 | Kennedy | 317/262 S X |
| 2,928,204 | 3/1960 | Kahn et al. | 43/107 |
| 3,366,854 | 1/1968 | Robinson | 317/262 S |
| 3,504,892 | 4/1970 | Crist | 317/262 S X |
| 3,847,120 | 11/1974 | Hicks | 119/29 |
| 3,878,444 | 4/1975 | Miller | 317/262 S |

*Primary Examiner*—Harry Moose
*Attorney, Agent, or Firm*—Alan H. Levine

[57] ABSTRACT

An elongated base carries two uninsulated electric wires connected to a power source for providing a voltage difference between the wires. The base is placed in any area from which pests, such as rodents or birds, are to be removed. The base may be an electric cable which is to be protected from rodents. Where birds are involved, the base is an elongated perch of insulative material carrying two wires spaced apart by a distance small enough such that the foot of a bird alighting on the perch will touch both wires and be shocked. The perch may be a flexible cord strung between upstanding posts, or it may be a flat strip with both wires on one face of the strip. The perch may be arranged above a receptacle for catching a bird falling from the perch. A mirror may be arranged near the base, and means for reproducing or recording and reproducing bird sounds may be located near the base, for attracting a bird to the base. Electric power may be applied to the wires intermittently and at an adjustable voltage level.

13 Claims, 6 Drawing Figures

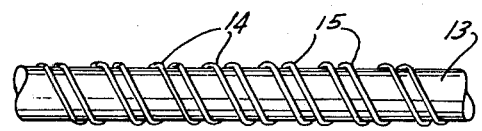
FIG.3
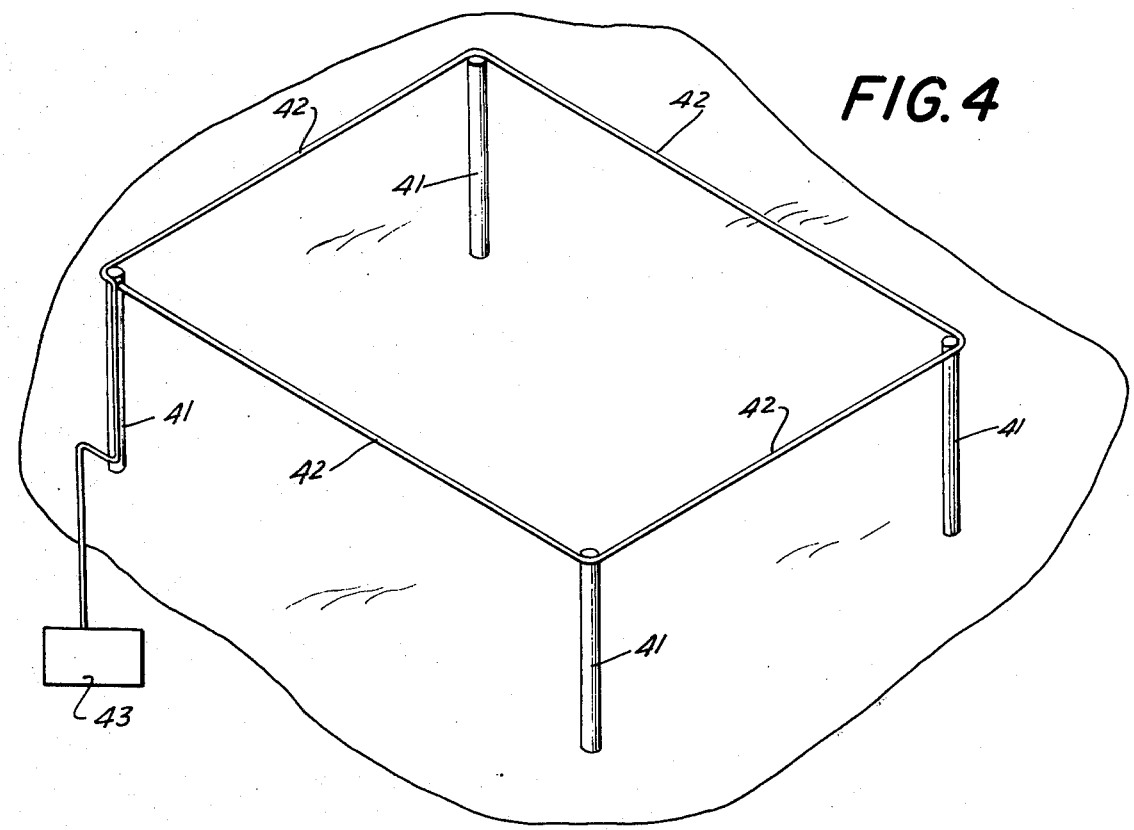
FIG.4
FIG.5
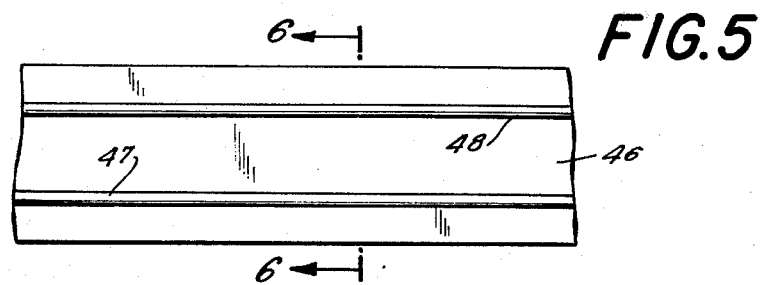
FIG.6
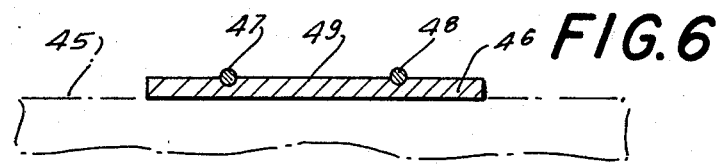

APPARATUS FOR REMOVING BIRDS AND OTHER PESTS

This invention relates to an apparatus for removing birds or other pests from a selected environment. In one form of the invention, birds or other pests entering the protected environment are repelled. In another form, a bird in the protected environment is attracted and trapped for subsequent removal from the environment.

It is often desirable to keep birds out of particular areas. Examples of such areas are fruit orchards, vineyards, and other areas under cultivation, since birds eat fruit and seeds. Another example is window ledges, since birds foul such ledges and make them unsightly. Furthermore, it is sometimes desirable to keep rodents and other earth-bound pests out of certain areas, or away from certain facilities, such as electric cables.

Another type of problem is presented when a bird accidentally enters the interior of a building and cannot find its way out. Catching and removing a bird from inside a building is usually difficult.

It is an object of the present invention to provide an apparatus for removing birds, and pests generally, from an area without causing permanent injury to the birds.

It is another object of the invention to provide such an apparatus which performs its function by subjecting the birds or pests to a mild electric shock.

It is a further object of the invention to provide an area which is to be maintained bird-free with elongated, electrified perches.

It is an additional object of the invention to provide a bird-catching apparatus involving an electrified perch, means such as a mirror and/or sound-reproducing apparatus for attracting bird to the perch, and a receptacle beneath the perch for catching the bird after it is stunned and falls from the perch.

Additional objects and features of the invention will be apparent from the following description in which reference is made to the accompanying drawings.

In the drawings:

FIG. 3 is a fragmentary view, on an enlarged scale, of the perch forming part of the apparatus;

FIG. 4 is a perspective view of another embodiment of the invention;

FIG. 5 is a fragmentary face view of still another embodiment of the invention; and FIG. 6 is a cross-sectional view taken along line 6—6 of FIG. 5.

Figure 1:
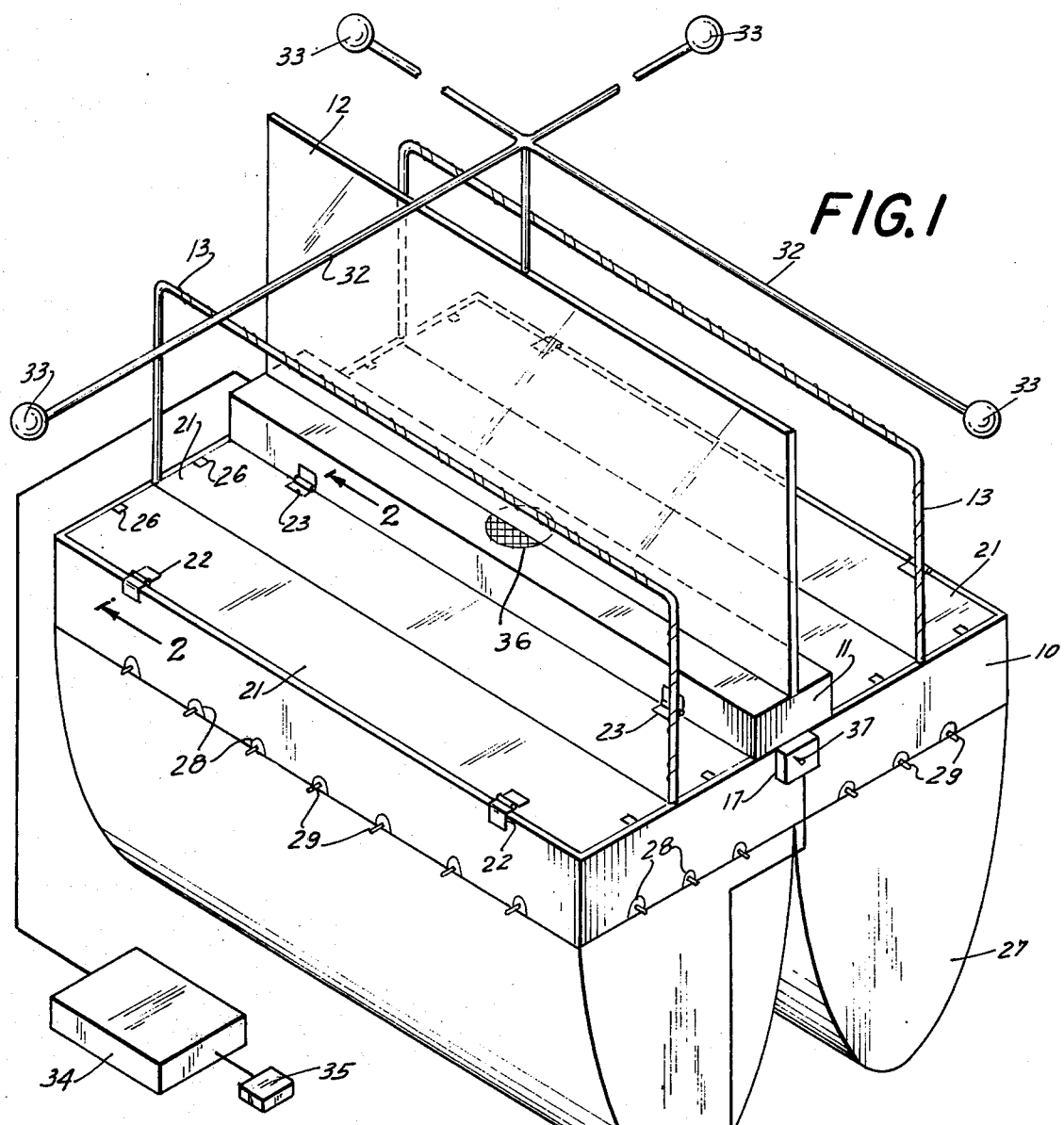
FIG. 1 is a perspective view of a bird-catching apparatus according to the present invention.
Figure 2:
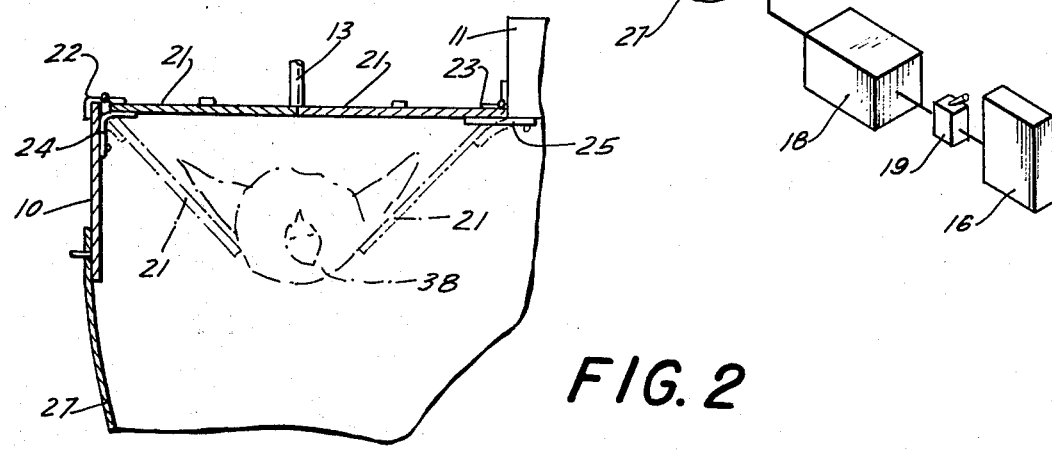
FIG. 2 is a fragmentary cross-sectional view taken along line 2—2 of FIG. 1.

An apparatus chosen to illustrate the present invention, and shown in FIGS. 1–3, is for use in removing a bird from the interior of a building, such as a factory, a warehouse, or even a house. The apparatus includes a rectangular frame 10 which may be hung from the ceiling or mounted on a wall by any suitable means not shown. Extending across the center of frame 10 is an elongated rectangular housing 11 upon which a vertical double-sided mirror 12 is mounted. On each side of mirror 12, frame 10 carries a perch 13. In this example, each perch is in the form of a rigid rod having a substantially circular cross-sectional shape. The rod is formed of an insulative material, such as a suitable plastic, bent into an inverted U-shape.

Wrapped around each perch 13, in a spiral formation, are a pair of uninsulated electric wires 14 and 15 (see FIG. 3). The wires 14 and 15 are spaced apart by a distance small enough so that when a bird alights on either perch 13, its foot will certainly engage both wires 14 and 15. Although wires 14 and 15 are shown in a spiral formation, they could be arranged along two spaced parallel paths along the top of perch 13, in any other suitable formation, the only requirement being that a bird alighting at any point on the perch will touch both wires.

Both pairs of wires 14 and 15 are supplied with voltage from a power source 16, which may be a battery or the power supplied to the building by an electric utility. The circuit also includes, between the power source and the wires, a rheostat 17, and a switch 18 which repetitively and automatically turns on and off. Switch 18 may be a flasher of the type used in the directional signal circuit of an automobile, and is preferably located within housing 11. A main power switch 19 is also included.

Beneath each perch are a pair of doors 21, one door being secured by hinges 22 to frame 10, and the other door being secured by hinges 23 to housing 11. A leaf spring 24 (FIG. 2) fixed to frame 10 and a leaf spring 25 fixed to housing 11 hold doors 21 in a horizontal, closed condition against abutments 26 projecting inwardly from frame 10. Suspended from frame 10 beneath each pair of doors 21 is a receptacle 27, which in this example is a heavy duty plastic or cloth bag. Receptacle 27 is removably mounted on the frame by means of apertured tabs 28, projecting upwardly from the receptacle edges, which fit over pins 29 projecting from the frame. However, other mounting means can be employed which permit the receptacle 27 to be removed at will from the frame 10. Furthermore, other receptacle arrangements can be employed; for example, it is contemplated that receptacle 27 and doors 21 may be furnished as a unit removably mounted in frame 10.

Mounted on mirror 12, by means of booms 32, are a plurality of microphones 33. The microphones are electrically connected to a sound recording and playback unit 34, such as a conventional tape recorder and player, furnished with a switch 35 for automatically and periodically switching the unit 34 from record mode to playback mode. Both the unit 34 and switch 35 are preferably arranged within housing 11, but are shown exposed for clarity. Also within housing 11 is a speaker 36 through which sounds on the tape in unit 34 are transmitted throughout the area in which the apparatus is located. Tape unit 34 may be energized from power source 16.

When a bird inadvertently enters a building, and it is desired to remove the bird, switch 19 is closed to energize the apparatus. Switch 18 causes wires 14 and 15 to be intermittently connected to power source 16. During the periods of connection, there is a voltage difference between wires 14 and 15. For example, if power source 16 is a battery, wire 14 is connected to the positive terminal of the battery and wire 15 is connected to the negative terminal. The amount of the voltage difference between the wires can be varied by adjusting rheostat 17 by means of knob 37. The adjustment is such that the voltage is sufficient to temporarily stun a bird without permanently injuring it. The larger the bird to be caught, the higher the voltage which is used.

When switch 19 is closed, tape unit 34 begins operating in a record mode, and the sounds made by the bird to be caught are picked up by microphones 33 and recorded by unit 34. After a period of time, preferably a few minutes, switch 35 causes unit 34 to play back the bird's sounds through speaker 36. The bird is attracted by the sounds eminating from speaker 36, and flies toward them. The attraction is enhanced when the bird glimpses itself in mirror 12, and ultimately it alights on one of the perches 13. Upon touching wires 14 and 15 the bird receives an electric shock which stuns it, if switch 18 is closed. As long as switch 18 remains closed, the bird cannot release perch 13. However, when switch 18 opens, the stunned bird 38 (FIG. 2) falls upon doors 21. The weight of the bird causes the doors to swing open downwardly, against the force of springs 24 and 25, and the bird falls into receptacle 27, whereupon the doors 21 are snapped shut by springs 24 and 25. Receptacle 27 is then carefully removed from frame 10, and with the bird within the receptacle it is taken outside the building and opened so that the bird can fly away as soon as it recovers from the shock.

If desired, microphones 33 and booms 32, as well as switch 35, can be eliminated, and prerecorded bird sounds played on tape unit 34 through speaker 36. However, since it cannot be known in advance what type of bird it will be necessary to remove, the use of a microphone or microphones to record the bird's own sound is preferable. Also, although a double unit involving two perches 13, two pairs of doors 21, and two receptacles 27 is shown, a single unit may be employed if desired.

When birds are to be removed from an outdoor area, and discouraged from returning, an arrangement as shown in FIG. 4 is employed. Upright posts 41 are secured in the ground, and an elongated perch 42 strung between the posts. In this case, the perch is preferably a flexible cord of plastic or other suitable insulative material. Two electric wires (now shown) are carried by perch 42 in the way described above with respect to perch 13. The wires are provided with voltage from a battery 43. When birds alight on perch 42, they receive a shock strong enough to chase them, but not necessarily strong enough to stun them. Posts 41 may be only a few inches tall, when a newly seeded area is being protected, or they may be many feet tall when an orchard is being protected.

When it is desired to remove birds from a surface 45, such as a window ledge, and discourage them from returning, an arrangement as shown in FIGS. 5 and 6 is employed. A perch 46 in the form of a flat strip of plastic, textile fabric, or other insulative material is provided with uninsulated wires 47 and 48 exposed on one surface 49 of the strip. The wires are spaced close enough so that a bird's foot will touch them both when it alights on the perch. The wires are connected to a source of voltage, so that the birds landing on the ledge or other surface receive a shock and hence fly away.

Thus far, the invention has been described in terms of a bird-removing apparatus. However, it has broader utility in terms of removing pests generally from particular places. For example, to prevent rodents for gnawing through the insulation of overhead or underground electrical cables, wires 14 and 15 as illustrated in FIG. 3 may be wrapped around the cables. Then when the rodent touches the cable, it receives a shock and the rodent is thereby driven away from the cable.

Also, an elongated base, similar to the perch 42 of FIG. 4 or the perch 46 of FIGS. 5 and 6, carrying wires 14 and 15 or 47 and 48, respectfully, may be laid on the ground in an area to be protected from rodents or other earth-bound pests. The pest touching the wires receives a shock and is frightened away.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. Apparatus for removing birds from a selected environment, comprising:
   a narrow elongated perch of non-electrically-conductive material,
   a pair of electrically-conductive wires carried by, and exposed on the surface of, said perch, said wires being spaced apart by a distance small enough such that when a bird alights on said perch its foot engages both of said wires,
   means for connecting said wires to a source of electric power for providing a voltage difference between said two wires, and
   a receptacle beneath said perch for catching a bird which falls from said perch after alighting thereon.

2. Apparatus as defined in claim 1 wherein said perch is a flexible cord strung between upstanding posts spaced apart in the selected environment.

3. Apparatus as defined in claim 1 wherein said perch is a flat strip of flexible material for securement to a supporting surface, both of said wires being exposed on one face of said strip.

4. Apparatus as defined in claim 1 wherein said perch has a generally circular cros-sectional shape, and said wires are wrapped around said perch in a spiral orientation.

5. Apparatus as defined in claim 1 including:
   a frame upon which said perch is supported, said receptacle being carried by said frame.

6. Apparatus as defined in claim 5 including means for removably connecting said receptacle to said frame.

7. Apparatus as defined in claim 6 wherein said receptacle is a bag.

8. Apparatus as defined in claim 1 including at least one door between said perch and said receptacle, and means biasing said door into a position in which it closes said receptacle, said door being openable by the weight of a bird falling on to it.

9. Apparatus as defined in claim 1 including a mirror adjacent to said perch.

10. Apparatus as defined in claim 1 wherein said means for connecting said wires to a source of electric power includes a switching means for intermittently energizing and deenergizing said wires.

11. Apparatus as defined in claim 1 wherein said means for connecting said wires to a source of electric power includes means for adjusting the voltage difference between said two wires.

12. Apparatus as defined in claim 1 including means for reproducing bird-attracting sounds in the vicinity of said perch.

13. Apparatus as defined in claim 12 wherein said reproducing means includes a sound recording and playback unit, and including a microphone for transmitting to said unit for recording sounds of a bird in the selected environment, and means for periodically switching said unit from record mode to playback mode, the sounds of the bird in the selected environment being reproduced during the latter mode.

* * * * *